(12) United States Patent
Rodman et al.

(10) Patent No.: US 8,023,458 B2
(45) Date of Patent: *Sep. 20, 2011

(54) METHOD AND APPARATUS FOR WIDEBAND CONFERENCING

(75) Inventors: Jeffrey Rodman, San Francisco, CA (US); David Drell, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 1158 days.

This patent is subject to a terminal disclaimer.

(21) Appl. No.: 11/679,489

(22) Filed: Feb. 27, 2007

(65) Prior Publication Data

US 2007/0140456 A1    Jun. 21, 2007

Related U.S. Application Data

(63) Continuation of application No. 10/335,108, filed on Dec. 31, 2002, now Pat. No. 7,221,663.

(60) Provisional application No. 60/345,929, filed on Dec. 31, 2001.

(51) Int. Cl.
*H04Q 7/00* (2006.01)

(52) U.S. Cl. ........................................ 370/329; 370/401

(58) Field of Classification Search .................. 370/329, 370/401
See application file for complete search history.

(56) References Cited

U.S. PATENT DOCUMENTS

| | | | |
|---|---|---|---|
| 3,573,377 A | 4/1971 | Anderson et al. | |
| 3,612,767 A | 10/1971 | Anderson et al. | |
| 3,649,761 A | 3/1972 | Bush | |
| 3,927,269 A | 12/1975 | Yoshino et al. | |
| 4,058,769 A | 11/1977 | Alderman | |
| 4,257,119 A | 3/1981 | Pitroda | |
| 4,311,877 A | 1/1982 | Kahn | |
| 4,351,062 A | 9/1982 | Yoshiya | |
| 4,384,362 A | 5/1983 | Leland | |
| 4,425,642 A | 1/1984 | Moses et al. | |
| 4,544,804 A | 10/1985 | Herr et al. | |
| 4,673,317 A | 6/1987 | Haug | |
| 4,782,521 A | 11/1988 | Bartlett | |
| 4,796,293 A | 1/1989 | Blinken et al. | |
| 4,901,307 A | 2/1990 | Gilhousen et al. | |
| 4,945,412 A | 7/1990 | Kramer | |
| 4,995,071 A | 2/1991 | Weber et al. | |
| 5,003,593 A | 3/1991 | Mihm, Jr. | |
| 5,473,631 A | 12/1995 | Moses | |

(Continued)

FOREIGN PATENT DOCUMENTS

EP        0 669 749        8/1995

(Continued)

OTHER PUBLICATIONS

International Search Report received in corresponding International Application No. PCT/US02/41778 dated Jul. 17, 2003.

(Continued)

*Primary Examiner* — Creighton Smith
(74) *Attorney, Agent, or Firm* — Wong, Cabello, Lutsch, Rutherford & Brucculeri LLP

(57) ABSTRACT

A method and apparatus for wideband voice and optional data conferencing over a telecommunications network channel between at least two wideband communications devices. An exemplary method comprises establishing an audio link, verifying wideband capability between the at least two wideband communications devices, training modems of the at least two wideband communications device to line conditions, and adjusting the telecommunications connection line conditions between the communications devices. Once a wideband connection has been established, audio and data may be simultaneously exchanged.

20 Claims, 13 Drawing Sheets

U.S. PATENT DOCUMENTS

| | | | |
|---|---|---|---|
| 5,526,354 | A | 6/1996 | Barraclough et al. |
| 5,530,699 | A | 6/1996 | Kline |
| 5,572,247 | A | 11/1996 | Montgomery et al. |
| 5,598,429 | A | 1/1997 | Marshall |
| 5,625,407 | A | 4/1997 | Biggs et al. |
| 5,677,728 | A | 10/1997 | Schoolman |
| 5,687,095 | A | 11/1997 | Haskell et al. |
| 5,724,383 | A | 3/1998 | Gold et al. |
| 5,758,079 | A | 5/1998 | Ludwig |
| 5,761,239 | A | 6/1998 | Gold et al. |
| 5,790,591 | A | 8/1998 | Gold et al. |
| 5,835,129 | A | 11/1998 | Kumar |
| 5,841,763 | A | 11/1998 | Leondires et al. |
| 5,886,734 | A | 3/1999 | Ozone et al. |
| 5,894,321 | A | 4/1999 | Downs et al. |
| 5,914,940 | A | 6/1999 | Fukuoka et al. |
| 5,916,302 | A | 6/1999 | Dunn et al. |
| 5,983,192 | A | 11/1999 | Botzko et al. |
| 5,983,261 | A | 11/1999 | Riddle |
| 5,991,385 | A | 11/1999 | Dunn et al. |
| 5,999,207 | A | 12/1999 | Rodrigues et al. |
| 5,999,996 | A | 12/1999 | Dunn |
| 6,049,531 | A | 4/2000 | Roy |
| 6,088,347 | A | 7/2000 | Minn et al. |
| 6,088,368 | A | 7/2000 | Rubinstain et al. |
| 6,111,936 | A | 8/2000 | Bremer |
| 6,130,880 | A | 10/2000 | Naudus et al. |
| 6,134,223 | A | 10/2000 | Burke et al. |
| 6,154,524 | A | 11/2000 | Bremer |
| 6,170,011 | B1 | 1/2001 | Beck et al. |
| 6,178,237 | B1 | 1/2001 | Horn |
| 6,185,285 | B1 | 2/2001 | Relyea et al. |
| 6,192,395 | B1 | 2/2001 | Lerner et al. |
| 6,202,084 | B1 | 3/2001 | Kumar et al. |
| 6,208,372 | B1 | 3/2001 | Barraclough |
| 6,230,197 | B1 | 5/2001 | Beck et al. |
| 6,272,176 | B1 | 8/2001 | Srinivasan |
| 6,327,567 | B1 | 12/2001 | Willehadson et al. |
| 6,345,047 | B1 | 2/2002 | Regnier |
| RE37,802 | E | 7/2002 | Fattouche et al. |
| 6,421,355 | B1 | 7/2002 | Quiring et al. |
| 6,442,190 | B1 | 8/2002 | Nguyen |
| 6,453,022 | B1 | 9/2002 | Weinman, Jr. |
| 6,453,336 | B1 | 9/2002 | Beyda et al. |
| 6,501,739 | B1 | 12/2002 | Cohen |
| 6,501,740 | B1 | 12/2002 | Sun et al. |
| 6,580,789 | B1 | 6/2003 | Simpson et al. |
| 6,584,138 | B1 | 6/2003 | Neubauer et al. |
| 6,628,644 | B1 | 9/2003 | Nelson et al. |
| 6,661,833 | B1 | 12/2003 | Black et al. |
| 6,671,263 | B1 | 12/2003 | Potter et al. |
| 6,728,367 | B1 | 4/2004 | Swam |
| 6,731,609 | B1 | 5/2004 | Hirni et al. |
| RE38,523 | E | 6/2004 | Ozluturk |
| 6,765,895 | B1 | 7/2004 | Watanabe |
| 6,789,753 | B2 | 9/2004 | Aoki et al. |
| 6,792,092 | B1 | 9/2004 | Michalewicz |
| 6,812,955 | B2 | 11/2004 | Takaki et al. |
| 6,885,652 | B1 | 4/2005 | Ozukturk et al. |
| 6,888,935 | B1 | 5/2005 | Day |
| 6,898,620 | B1 | 5/2005 | Ludwig et al. |
| 6,940,826 | B1 | 9/2005 | Simard et al. |
| 7,003,042 | B2 | 2/2006 | Morelos-Zaragosa et al. |
| 7,006,456 | B2 | 2/2006 | Rabipour et al. |
| 7,006,616 | B1 | 2/2006 | Christofferson et al. |
| 7,107,312 | B2 | 9/2006 | Hackbarth et al. |
| 7,185,054 | B1 | 2/2007 | Ludwig et al. |
| 7,302,050 | B1 | 11/2007 | Michalewicz |
| 7,386,026 | B1 | 6/2008 | Gold |
| 7,428,223 | B2 | 9/2008 | Nierhaus et al. |
| 2001/0008556 | A1 | 7/2001 | Bauer et al. |
| 2001/0016038 | A1 | 8/2001 | Sammon et al. |
| 2001/0033613 | A1 | 10/2001 | Vitenberg |
| 2001/0043571 | A1 | 11/2001 | Jank et al. |
| 2002/0018117 | A1 | 2/2002 | Tosaya |
| 2002/0083462 | A1 | 6/2002 | Arnott |
| 2002/0093985 | A1 | 7/2002 | Nimmagadda |
| 2002/0097679 | A1 | 7/2002 | Berenbaum |
| 2002/0122429 | A1 | 9/2002 | Griggs |
| 2002/0131377 | A1 | 9/2002 | DeJaco et al. |
| 2002/0151294 | A1 | 10/2002 | Kirby et al. |
| 2003/0016676 | A1 | 1/2003 | Allen et al. |
| 2003/0048353 | A1 | 3/2003 | Kenoyer et al. |
| 2003/0053443 | A1 | 3/2003 | Owens |
| 2003/0112947 | A1 | 6/2003 | Cohen |
| 2003/0123645 | A1 | 7/2003 | Comisky |
| 2003/0142635 | A1 | 7/2003 | Royer et al. |
| 2003/0179859 | A1 | 9/2003 | Chea et al. |
| 2004/0003045 | A1 | 1/2004 | Tucker et al. |
| 2004/0012669 | A1 | 1/2004 | Drell et al. |
| 2004/0125932 | A1 | 7/2004 | Orbach et al. |
| 2005/0157777 | A1 | 7/2005 | Mizuno |
| 2005/0213739 | A1 | 9/2005 | Rodman et al. |
| 2005/0232166 | A1 | 10/2005 | Nierhaus |
| 2005/0254558 | A1 | 11/2005 | Dutka |
| 2006/0098692 | A1 | 5/2006 | D'Angelo |
| 2006/0222155 | A1 | 10/2006 | Summers et al. |
| 2007/0034166 | A1 | 2/2007 | Brooks |
| 2008/0144701 | A1 | 6/2008 | Gold |

FOREIGN PATENT DOCUMENTS

| | | |
|---|---|---|
| EP | 0 680 190 | 11/1995 |
| EP | 1 006 706 | 7/2003 |
| JP | 05300509 | 12/1993 |
| JP | 08125738 | 5/1996 |
| JP | 10042264 | 2/1998 |
| RU | 2 096 921 | 11/1997 |
| WO | 94/18779 | 8/1994 |
| WO | 98/19458 | 5/1998 |
| WO | 99/12351 | 3/1999 |

OTHER PUBLICATIONS

Search Report received in corresponding European Application No. 03743750.6-2414-PCT/US0306698 dated Mar. 16, 2005.

Search Report received in corresponding European Application No. 03726026.2-2414-US0306736 dated Mar. 10, 2005.

International Search Report received in corresponding International Application No. PCT/US01/51636 dated Sep. 26, 2001.

Mermeistein P.; "G.722, A New CCITT Coding Standard for Digital Transmission of Wideband Audio Signals;" IEEE Communications Magazine; 26(1) Jan. 1988; pp. 8-15.

Mermeistein; "G.722, A New CCIT Coding Standard for Digital Transmission of Wideband Audio Signals;" IEEE Communications Magazine; Jan. 1988—vol. 26, No. 1.

Schulzrinne; "Voice Communication Across the Internet: A Network Voice Terminal;" 1992, pp. 1-34, Amherst, MA.

Haojun; "Implementing an Audio Multipoint Processor on DSP Array;" 2001, pp. 441-444.

Jung; "The Multimedia Desktop Conference System Adaptability in Network Traffic on LAN;" 1995; pp. 334-338, IEEE.

Noore; "Computer-Based Multimedia Video Conferencing System;" 1993; pp. 587-591.

Sasse; "Workstation-Based Multimedia Conferencing: Experiences from the MICE Project;" 1994; pp. 1-6.

User's Guide Adminstrator's guide, SoundStation(R) VTX 1000 Operation Manual, (c)2003 Polycom, Inc.

Quick Installation Guide, Vortex(R)—Soundstation VTX 1000TM, (c)2004, Polycom, Inc.

J. Rodman, Polycom(R), White Paper—"The Power of Shared Resources: Conference Room Integration in the VTX/VSX Environment" Jun. 2, 2004, pp. 1-6.

J. Rodman, Polycom(R), White Paper—"The Distributed Dawn: the Emergence of Versatile Performance in the Conferencing Environment" Jun. 2, 2004, pp. 1-7.

H324 Videophones Standard; http://www.elextronika.com/tvphone/h324.htm; Retrieved Mar. 14, 2005; 4 pages.

International Telecommunication Union; ITU-T Telecommunication Standardization Sector of ITU H.234 (Mar. 2002) Series H: Audio-visual and Multimedia Systems Infrastructure of Audiovisual services—Systems and terminal equipment for audiovisual services Terminal for low bit-rate multimedia Communication; ITU-T Recommendation H.324.

MultiTech(R) Systems; MultiModernDSVD Compact DSVD Modems; http://www.multitech.com/Products/Families/MultiModernDSVD; obtained Mar. 14, 2005.

DSVD and H324 Standards; TechOnLine—Modern and Fax Standards and Software; http://www.techonline.com/community/ed_resource/feature_article/20041; Obtained Mar. 24, 2005.

Hering, et al.; "Safety and Security Increases for Air Traffic Management Through Unnoticeable Watermark Aircraft Identification Tag Transmitted with VHF Voice Communication" pp. 1-10; © 2003 IEEE.

CDMA Overview, Resources/Tutorials; http://www.telecomspace.com/cdma.html; Retrieved Sep. 24, 2006; 5 pages.

Spread spectrum—Wikipedia, the free encyclopedia; http://en.wikipedia.org/wiki/Spread_spectrum; retrieved Sep. 24, 2006; 4 pages.

Search Report received in corresponding European Application No. EP 02 72 8007 dated Sep. 26, 2006.

METHOD AND APPARATUS FOR WIDEBAND CONFERENCING

CROSS-REFERENCES TO RELATED APPLICATIONS

This application claims priority from U.S. patent application Ser. No. 10/335,108, filed Dec. 31, 2002, and entitled "Method and Apparatus for Wideband Conferencing," which claims priority from U.S. Provisional Patent Application No. 60/345,929, filed Dec. 31, 2001, and entitled "Method and Apparatus for IP Conferencing," and from U.S. Provisional Patent Application No. 60/360,984, filed Mar. 1, 2002, and entitled "Systems and Methods for Video Conferencing Across a Network," all of which are incorporated herein by reference.

BACKGROUND OF THE INVENTION

1. Field of the Invention

The present invention relates generally to the field of conferencing, and more particularly to a method and apparatus for wideband conferencing.

2. Description of the Background Art

Speakerphones and telephones are telecommunications devices used for a variety of purposes, typically for telephonic communications between two or more endpoints and two or more parties. Remote teleconferencing serves a valuable purpose, and often enables increased productivity between, or within, organizations without raising associated costs incurred due to travel and time constraints.

Telecommunications devices (e.g., speakerphones, etc.) of the prior art are typically used to transmit analog, voice-based communications at frequencies below 3.3 kiloHertz (kHz), and typically work over two different types of telecommunications networks. The first type of telecommunications network comprises the Plain Old Telephone System (POTS) and the Public Switched Telephone Network (PSTN). The second type of network relies upon network information technologies such as the Internet, a Local Area Network (LAN), a Wide Area Network (WAN) or a Virtual Private Network (VPN) to transmit voice signals as data packets. However, each of these types of networks suffers from limitations unique to their respective type of network.

Over a PSTN/POTS network, a telecommunications device routes calls between specialized computers known as switches. A call signal is sent through a Private Branch Exchange (PBX), which addresses and connects calls to a destination PBX and, ultimately, to a receiving telecommunications device.

Referring to FIG. 1, a POTS/PSTN conferencing system 100 is shown. An initiating telecommunications device 102 sends a calling signal to a PBX 104, which in turn routes the call to a switch 106. The switch 106, subsequently, routes the call to a receiving switch 108 over a PSTN 110. The call is then routed from the receiving switch 108 through a destination PBX 112 to a receiving telecommunications device 114. In analog mode, the telecommunications devices 102 and 114 may train and synchronize, adjusting for line conditions such as amplitude response, delay distortions, timing recovery, and echo characteristics. However, conventional phones and speakerphones do very little training and synchronizing, so the amount of training and synchronization can be anywhere to none, which still yields a working link (99.9% of phones do it this way) to other telecommunications devices. It should be noted that the PBX is optional. In this embodiment, the telecommunications device may be connected directly to the switch 106. This is the typical connection from a user's home.

A primary source of quality degradation with telecommunications devices occurs as a result of network infrastructure characteristics such as frequency handling and available bandwidth. The conferencing system 100 operating over a PSTN/POTS network is typically limited by both available frequency and a narrow range of bandwidth. These network characteristics limit type, form, and amount of data shared between telecommunications devices 102 and 114. Conventional narrow bandwidth systems further limit audio quality: audio bandwidth, audio noise level, audio path gain, etc.

Conventional telecommunications devices are typically designed to filter out frequencies above 3.3 kHz. However, the filtering of frequencies between 3.3 kHz and 7 kHz significantly reduces sound quality, clarity, and distinction. The fact that conventional telecommunications devices and networks filter frequencies above 3.3 kHz limits intelligibility of speech and other sounds, because much of the content that the ear depends on is carried in these higher frequencies. This results in connections that sound hollow, muddled, muffled, or distorted. The use of analog pathways also introduces significant variations in gain, thus one connection will be much quieter than another. This results in a connection that is difficult to hear. The use of analog pathways also often introduces significant noise, resulting in connections that are difficult to understand. The combination of all these degradations, which is common on conventional phone lines, results in poor and variable call quality. These problems are exacerbated when participants in a conference are in sub-optimal environments, such as reverberant rooms, when there are multiple participants who may interrupt one another, or when participants do not all share a common native language or dialect, resulting in accented speech that can be difficult to understand in the best of conditions, and impossible over a phone connection. Another problem often associated with conventional telecommunications devices includes the transmission of background noise and static over a PSTN call. Thus, current telecommunications devices often provide poor Quality of Service (QoS) and lack enhanced features and functionality.

Alternatively, the second type of telecommunications network may also rely upon PSTN, but transmits signals over digital networks using packet switching. This treatment results in a technique known as Voice over IP (VoIP) or simply IP. VoIP devices forward sound and other data as packets of information over digital networks using standards including ITU H.323, MGCP, SIP, etc. Using an embedded modem and codec, a VoIP device encodes voice (and/or other sounds) as data packets that are switched between network-addressed servers. The network-addressed servers process, reassemble, and convert digital signals to analog signals at a receiving VoIP device.

Referring to FIG. 2, an exemplary IP conferencing system 200 of the prior art is shown. An IP device 202 encodes sound from analog signals into digital data packets using a codec 204. Using a modem 206 or similar device, the system 200 switches data packets through a home (or other type of) network 208 such as a LAN, WAN, etc. One example of a communications device is an RS-232-C modem. The system 200 then transmits the data packets through a firewall 210, if one is present, to an access server 212. The access server 212 enables the data packets to be switched onto an Internet backbone 214.

Next, the system 200 forwards the data packets through a destination access server 216 and a destination firewall 218, if one is present, to a receiving home (or other type of) network 220. The data packets are re-modulated via a modem 222 or similar device, and encoded into analog voice-based signals using a codec 224. The modem 222 and codec 224 are embedded in a receiving VoIP device 226, in one example.

Although the system 200 enables VoIP, there are significant problems associated with this type of conferencing over an IP network. One problem of conventional PSTN and IP-capable telecommunications devices is an inability to conduct effective simultaneous sound (e.g., voice, etc.) and data conferencing due to bandwidth limitations and lower frequency ranges. Further, significant problems with conferencing over a VoIP network are that expanded services such as wideband audio or side-channel data cannot be shared with non-VoIP devices, which constitute the great majority of endpoints in the world.

Another limitation of VoIP telecommunications devices results from time delays incurred from data packet re-assembly. The delay in re-assembly results in broken and unnatural speech, greatly reducing the quality of the conference call. Still another limitation with IP conferencing is data vulnerability to external breaches of security. Although data encryption can be implemented using means such as public and private session keys, bandwidth restrictions impose a significant burden upon telecommunications devices and substantially affect QoS.

Multimedia conferencing represents a substantial improvement over voice conferencing. However, current telecommunications devices are incapable of overcoming existing network limitations. Furthermore, current telecommunications devices cannot effectually bridge or manage multiple calls. The limited frequency range of 3.3 kHz prohibits multiple call functions from being simultaneously performed including bridging or data exchange. Current telecomm devices can bridge and manage multiple calls, but their usability is degraded due to the fact that the available bandwidth is much less than the bandwidth of human speech. Further, this issue becomes more critical as more people are in the conference. Understandability, more sources of noise, increases difficulty in identifying the talker, for example. As a separate but significant issue in modern teleconferencing, there is very limited ability to communicate side-channel data (such as sending dial-additional-call commands, requesting cost-of-conference-so-far status information, and so forth) between the participants or to a bridging device. The most common technique is to use DTMF tones, which is slow and disruptive.

Yet another limitation of prior art narrowband conferencing systems is their ineffectiveness in handling multiple simultaneous speakers (or other sources of sound). A further problematic limitation of prior art narrowband speakerphones is call degradation due to the exclusionary filtering of signals above 3.3 kHz. Thus, conventional telecommunications devices have severe limitations related to QoS, data security, bridging, and advanced communications functions. Therefore, there is a need for a new and innovative method and apparatus for wideband audio conferencing using existing infrastructures to deliver enhanced services.

SUMMARY OF THE INVENTION

The present invention provides, in various embodiments, a method for wideband voice and data conferencing over a communications network between wideband communications devices. According to one embodiment of the present invention, a system determines whether a wideband audio communications device is communicating with another wideband audio communications device. If both devices have wideband capability, then data is sent via wideband audio communications. Alternatively, if one of the communications devices is not wideband capable, then the communication is performed via a narrowband connection. In both situations, the communications devices may train (coordinated and connected, which may include training) prior to the connection. Further, the system may adjust the communications between the communications devices based on network conditions.

In an exemplary embodiment of the system, a wideband audio communications device, such as a speakerphone, comprises an integrated modem, at least one microphone, and at least one audio codec. The at least one microphone obtains audio from conference participants located in proximity of the wideband audio communications device. The audio codec then encodes the obtained audio into digitized audio signals for transmission over a wideband audio connection to a receiving wideband audio communications device. In an exemplary embodiment, the wideband audio connection is over a PSTN. The wideband audio communications device further comprises a speaker for outputting audio received from a remote communications device.

A further understanding of the nature and advantages of the present inventions herein may be realized by reference to the remaining portions of the specification and the attached drawings.

DESCRIPTION OF EXEMPLARY EMBODIMENTS

Figure 1:
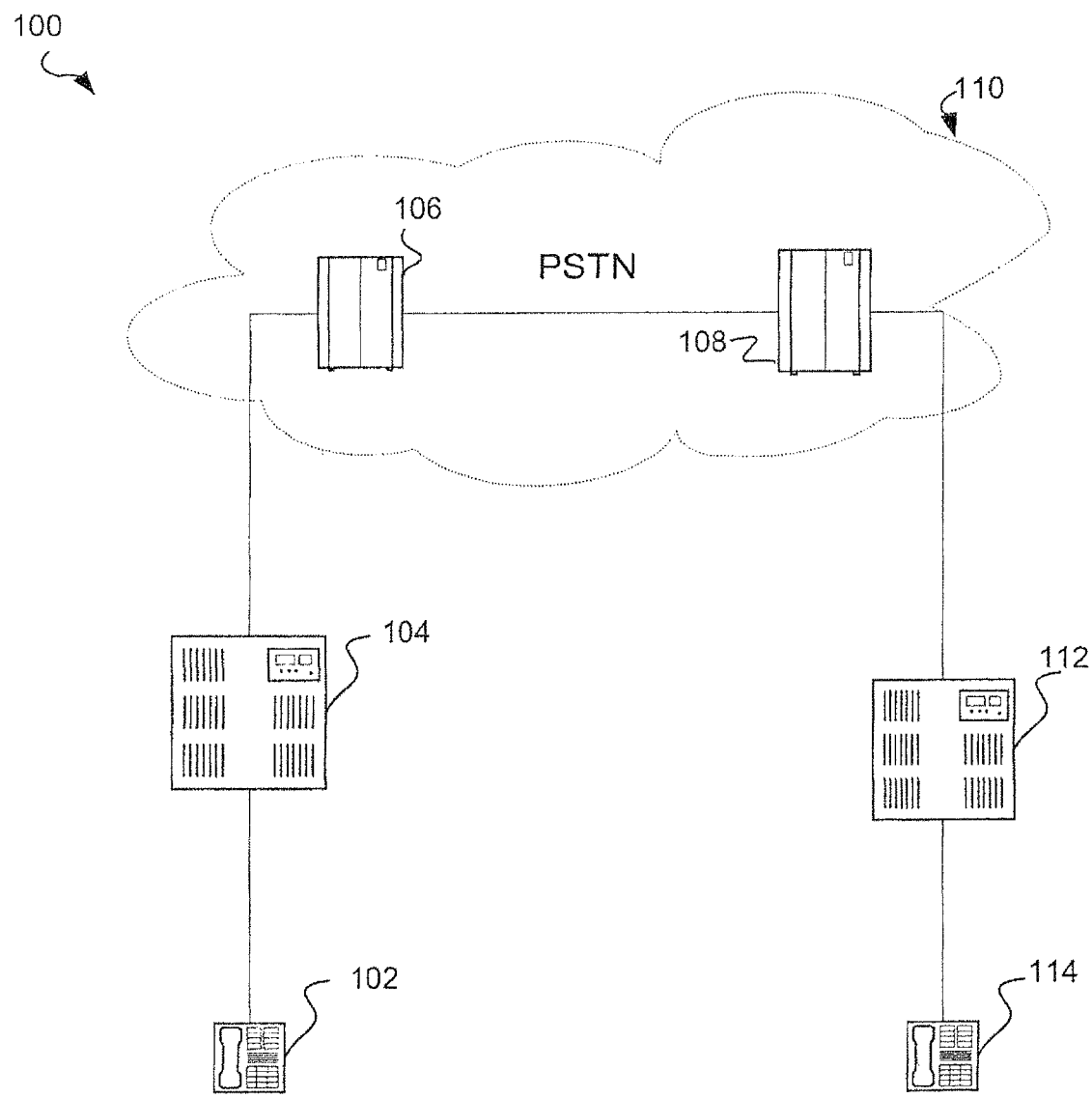
FIG. 1 illustrates a Plain Old Telephone System (POTS) and a Public-Switched Telephone Network (PSTN) of the prior art.
Figure 2:
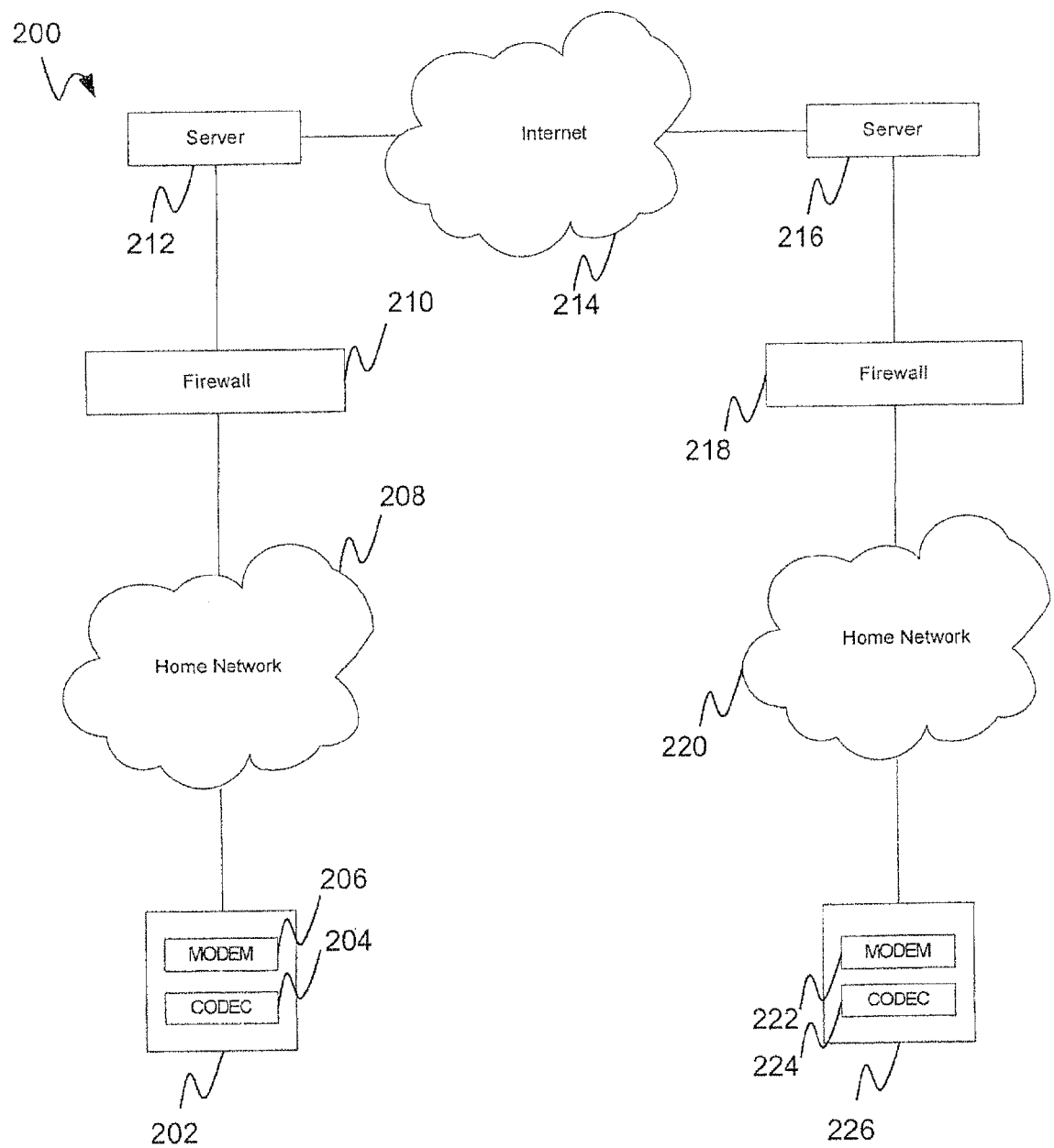
FIG. 2 illustrates a Voice Over Internet Protocol (VoIP) system of the prior art.

As shown in the exemplary drawings wherein like reference numerals indicate like or corresponding elements among the figures, exemplary embodiments of a system and method according to the present invention will now be described in detail. Detailed descriptions of various embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process, or manner.

As mentioned herein, various drawbacks to the prior art telephony approaches exist. For example, call degradation of prior art phone systems often occurs due to the exclusionary filtering of signals with frequencies above 3.3 kHz.

Advantageously, wideband audio communications devices eliminate numerous limitations of narrowband communications devices, such as conventional phones, and may effectively enable simultaneously combined audio and data communications. In one embodiment according to the present invention, video and audio conferencing at higher frequencies (e.g., 7 kHz) greatly increases call quality and clarity. Additionally, increased bandwidth, in which the bandwidth enhancement is based on the principle of exchanging audio as compressed digital information via a codec, permits improved capabilities such as voice and data security between endpoints. Wideband communications devices also enable simultaneous audio and data communications, wideband bridging, private session key exchange for network and data security, and additional call management capabilities.

Figure 3A:
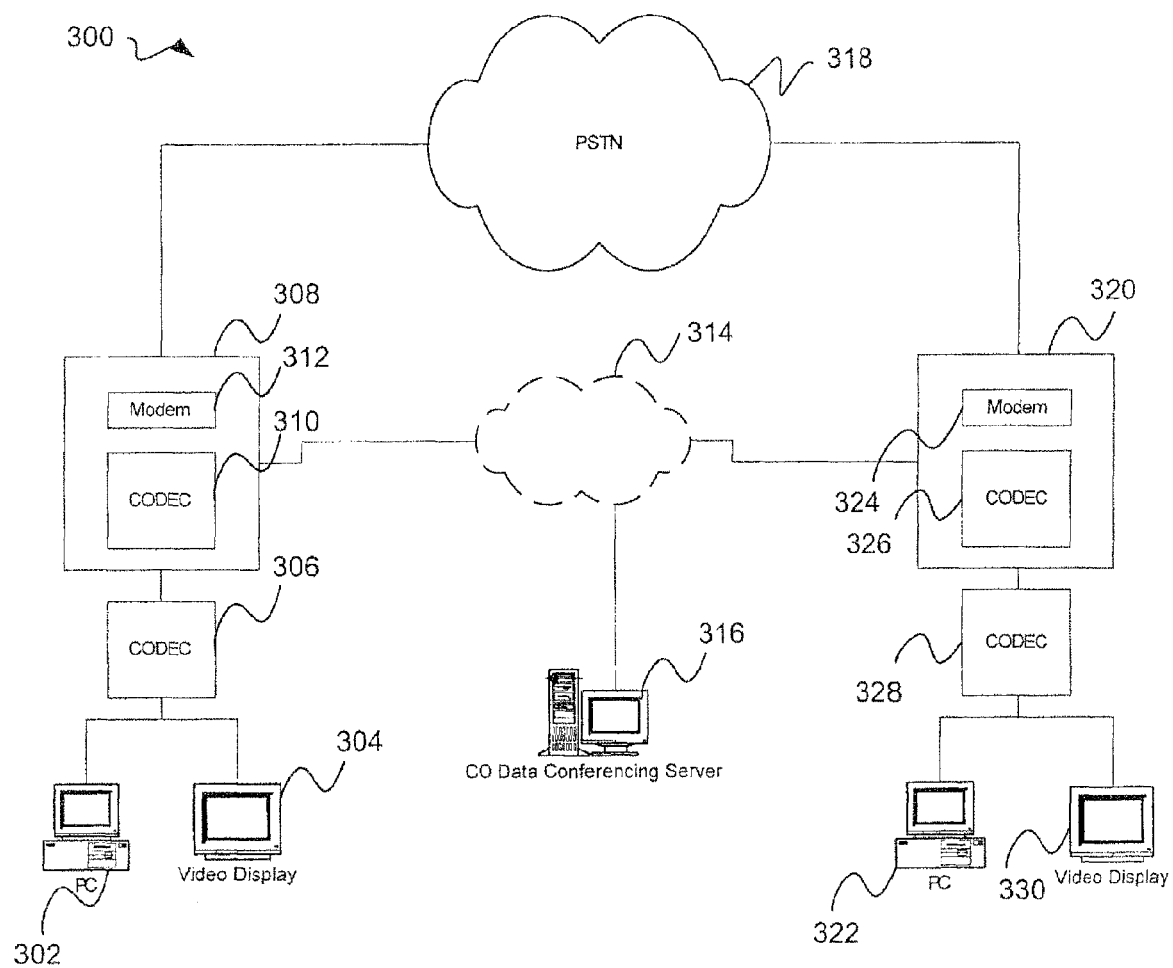
FIG. 3a illustrates a wideband conferencing system over a Public Switched Telephone Network (PSTN) according to one embodiment of the present invention.

Referring to FIG. 3a, an overview of an exemplary wideband conferencing system 300 of the present invention is depicted. This embodiment allows for the transmission of both audio and data signals. At one endpoint of the conferencing system 300 are a computing device 302 and a video display 304. In alternative embodiments, the computing device 302 and the video display 304 are integrated into one device. In a further embodiment, other devices may be coupled instead of, or in addition to, the computing device 302 such as projectors, cameras, etc. Data is input or initially stored in the computing device 302. The data is then forwarded to a codec 306, which compresses the data for transmission.

A wideband communications devices 308 (e.g., a telephone, speakerphone, etc.) coupled to the computing device 302 comprises at least one codec 310 and a modem 312. The wideband communications device 308 further comprises a microphone for picking up audio and a speaker (not shown) for outputting audio from a remote site. The codec 310 is a common device or technique for converting a signal (in this case, an analog, and especially audio, signal) to digital data. Examples of codecs include, but are not limited to, G.711, G.722, G.722.1, G.728, etc. Thus, the codec 310 receives audio signals from the microphone, and encodes the audio signals for transmission over a PSTN 318 at higher frequencies then conventional audio signals over PSTN. Although the codec 310 is shown embodied in the communications device 302, alternatively, the codec 310 may be embodied in a different device or be a stand-alone device.

The modem 312 modulates all signals for transmission over the PSTN 318. The modem 312 is a common device or technique for sending digital data over an analog medium such as a phone line. Examples of modems include Bell212, V.34, V.90, and V.92. Thus, the encoded audio signals from the codec 310 are modulated by the modem 312 and sent as digitized audio signals over the PSTN 318. In one embodiment, the modem 312 acts as a multiplexer to combine the audio signals, control data signals, and data signals received from the codec 306. In an alternative embodiment, a multiplexer or similar device may be utilized to combine these signals for transmission. In a further alternative embodiment, compressed speech data from the codec 310 and control data may be sent through the modem, while video/graphic data from the codec 306 is routed through a second network 314 via a router or switch.

Accessing an external communications network 314, such as the Internet, wideband communications devices 308 and 320 can access and retrieve data stored in a central office data conferencing server 316. The central office data conferencing server 316 may be a repository for data, be a voice bridge, or generally control the conference (e.g., allow multi-endpoint communications). In one embodiment, control signals for retrieving data from the data conferencing server 316 are sent over the PSTN 318 along with the audio signals. The control data is sent via a separate data channel. Further, a separate data side-channel may be utilized for sending connection information, such as URL and website information. In these embodiments, the wideband communications device 308 and receiving wideband communications device 320 both have dual connections to the PSTN 318 and the external communications network 314. The present system uses the limited data exchange capabilities of the PSTN 318 to send control signals to efficiently manage data retrieval of substantial file sizes from the external communications network 314. Included with the control signals may be a private password or session key, which directs the receiving wideband communications device 320 and/or a receiving computing device 322 to a specific network address to retrieve data (e.g., the data conferencing server 316).

At a receiving endpoint, a receiving modem 324 demodulates received conference signals. The modem 324 (if it is acting as a multiplexer device) or a multiplexer device then separates the data signals from the audio signals. A receiving internal codec 326 decodes the received digitized audio signals. The audio is then output to a user through an internal speaker (not shown), while the data signals are sent to a codec 328. Control signals may either be utilized internal in the receiving communications device 320 or sent to the computing device 322. The receiving codec 328 then decodes the digital data signals enabling the data to be displayed at the receiving computing device 322 or a receiving video display 330, or utilized by other coupled devices. If the data signals contain the control signals, then the computing device 322 is directed to a specific network address to retrieve data. Both the data retrieve/display and the audio occur relatively simultaneously to an end user.

In the above-described embodiment, both audio and limited data signals are transmitted over the PSTN 318. In one embodiment, the transmitting communications device 308 modulates the control data and/or the data signals onto a carrier signal, or adds DTMF signals to the audio signal. The carrier or DTMF signal is then added to the audio signal prior to transmission. The multiplexing may occur at a specialized modem, or alternatively, at a separate multiplexing device. Alternatively, only audio signals may be sent via the PSTN 318 while data signals are sent via the external communications network 314.

Because communications is bilateral, the receiving communications device 320 and the receiving computing device 322 may operate as a transmitting communications device and transmitting computer device, respectively. In this situation, the codec 328 will encode/compress data received from the computing device 322 prior to forwarding the data to the communication device 320. Similarly, the codec 326 will encode the audio signals received from an internal microphone (not shown), while the modem 324 modulates all signals for transmission over the PSTN 318. On the receiving end, the communications device 308 now demodulates the signal with the modem 312, and decodes the audio signals via the codec 310. The audio is then output to a user via the internal speaker. Data signals are then sent to the codec 306 for decoding/decompression, and subsequent display on, or operated on by, the computing device 302 and/or the display 304, or sent to other coupled devices. In further embodiments, more computing devices may be coupled to the communications devices.

Figure 3B:
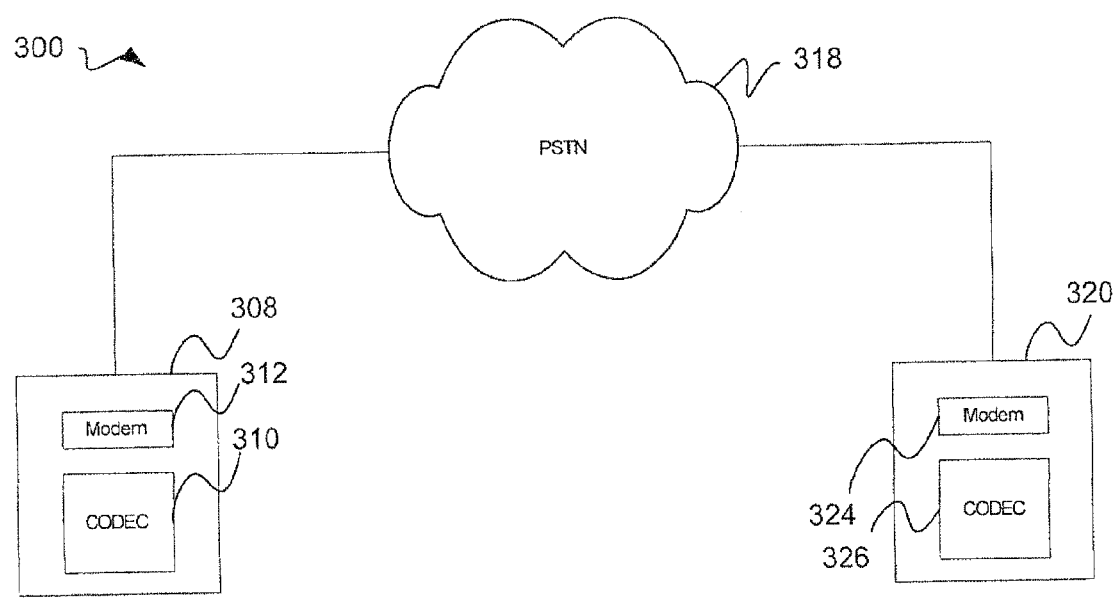
FIG. 3b illustrates a wideband audio conferencing system over a PSTN, according to an alternative embodiment of the present invention.

The conferencing system 300 of FIG. 3a is described in connection with data conferencing. However, it should be noted that a conferencing system, according to the present invention may operate without data exchange as simply a wideband audio conferencing system, as shown in FIG. 3b. In this embodiment, the communications device 308 is only coupled to the communications device 320 via the PSTN 318. Thus, digitized audio signals (and optional control data signals) are sent via the PSTN 318. It should be noted that although FIGS. 3a and 3b only show two communications devices coupled via the PSTN, any number of communications devices can be involved in a conference session.

Figure 4A:
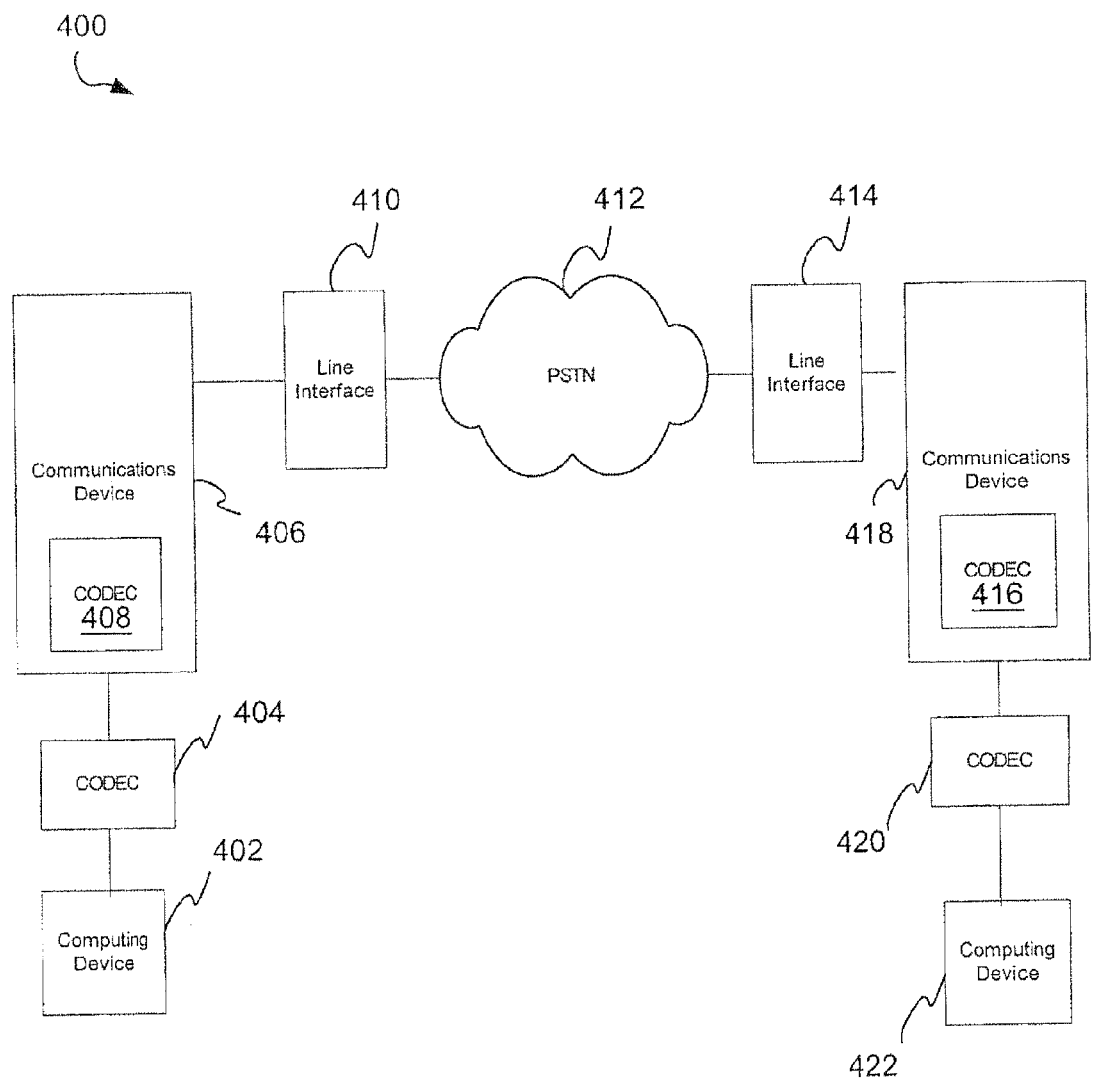
FIG. 4a illustrates a wideband conferencing system according to another embodiment of the present invention.

Referring to FIG. 4a, an exemplary wideband voice conferencing system 400 is shown whereby audio and data signals are transmitted via a PSTN 412. Initially, a computing device 402 provides data that is subsequently encoded/compressed by a codec 404. The encoded data is then sent to a wideband communications device 406.

The wideband communications device 406 (e.g., a telephone, speakerphone, etc.) comprises at least one codec 408, a microphone for picking up audio (not shown), and a speaker (not shown) for outputting audio from a remote site. The codec 408 receives audio signals from the microphone, and encodes the audio signals for transmission over the PSTN 412 in a digital form. A line interface 410 coupled to the communications device 406 is an exemplary means of establishing a network connection from the wideband communications device 406 to the PSTN 412. In one embodiment, the line interface 410 may be a ISDN hub utilizing protocols such as, but not limited to, SIP, TCP, and IP.

A receiving line interface 414 coupled to the PSTN 412 receives the encoded signals and forwards the signals to a communications device 418 which comprises a codec 416, a microphone (not shown), and a speaker (not shown). Subsequently, the receiving codec 416 decodes the audio signals and presents the audio to conference participants via the internal speakers. Roughly simultaneously, the data signals are forwarded to codec 420 for decoding. The decoded data is then transmitted to a computing device 422. Alternatively, the conferencing system may be reversed with the wideband communications device 418 transmitting data to the communications device 406. In further embodiments, more computing devices may be coupled to each of the communications devices.

Figure 4B:
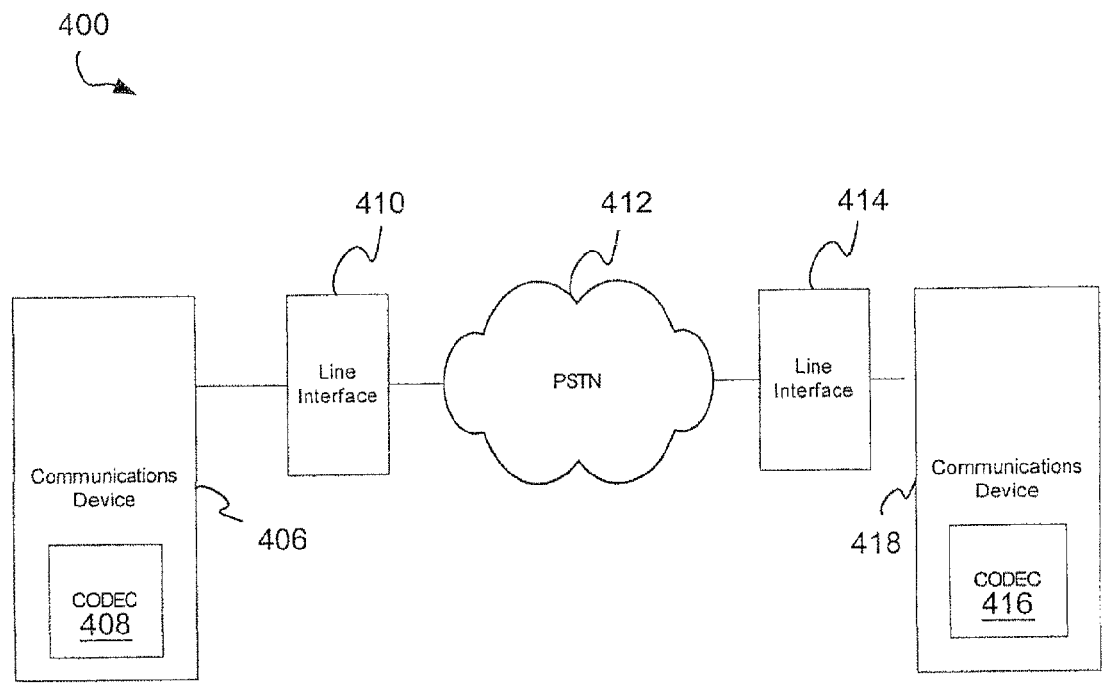
FIG. 4b illustrates an alternative, exemplary wideband audio conferencing system.

FIG. 4b illustrates a similar conferencing system to the FIG. 4a embodiment. However, the FIG. 4b embodiment only allows for communication of signals generated by the communications devices 406 or 418. Thus, audio received by the internal microphone of the communications device 406 is digitized by the codec 408 and sent via the PSTN 412 to the communications device 418, and vice-versa. Control data generated by the communications devices 406 and 418 may also be sent via the PSTN on a side-channel.

Figure 5A:
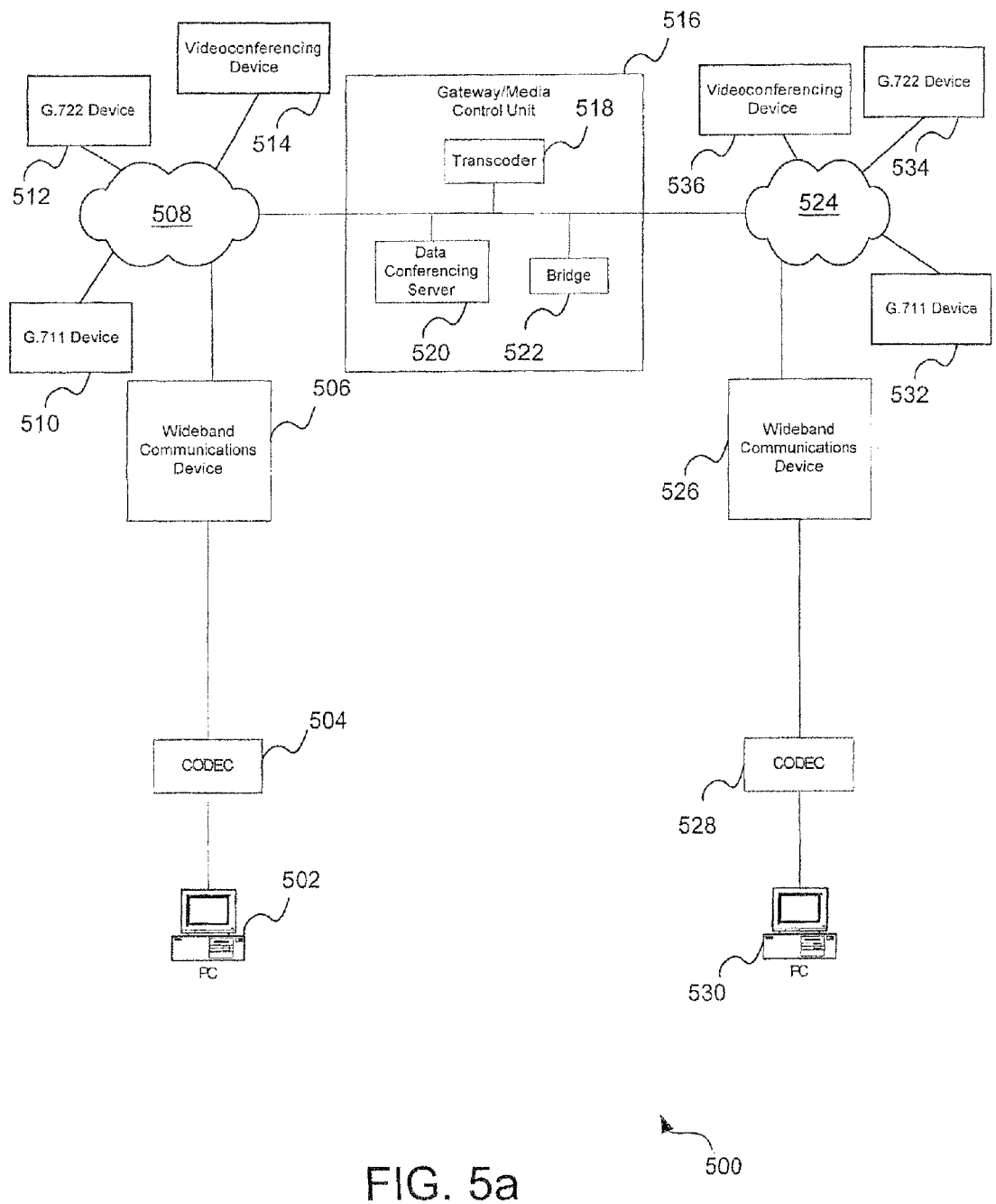
FIG. 5a illustrates a wideband data conferencing system between two wideband communications devices utilizing a gateway, according to one embodiment of the present invention.

Referring to FIG. 5a, another exemplary wideband conferencing system 500 uses bridging and media control. Initially, a computing device 502 transmits encoded data to a wideband communications device 506 using a codec 504, which processes the data signals for transmission. The wideband communications device 506, which is coupled to the network 508, also receives audio from an internal microphone (not shown). Other devices may also be coupled to the network 508 including, but not limited to, a G.711 communications device 510, a G.722.1 communications device 512, and a video conferencing device 514 in any combination thereof.

Accessed through the network 508, audio and data can be managed from a gateway/media control unit 516. The exemplary gateway/media control unit 516 controls signal routing and serves as a communications network interface for both video and audio signals. Video signals may include high-resolution still graphics, moving video images, images of spreadsheets, and other visual presentations. The gateway/media control unit 516 comprises a transcoder 518, a data conferencing server 520, and a bridge 522. The transcoder 518 encodes data retrieved from the data conferencing server 520. Alternatively, other embodiments of the gateway/media control unit 516 may contain more or less elements.

Additionally, the gateway/media control unit 516 enables multiple endpoints to be simultaneously bridged using the bridge 522 regardless of the use of data retrieval. The bridge 522 is capable of integrating PSTN audio, VGA-LAN (i.e., high-resolution graphics imagery) data, and IP-voice into a single conference. Data and bridged calls are routed through a destination network 524 to a receiving wideband communications device 526. Voice signals may be presented to a user though a speaker located in the communications device 526, while data signals are forwarded to a receiving codec 528. After decoding, the data may then be displayed at a receiving computing device 530. In addition to, or instead of, the communications device 526, other devices may be coupled to the network 524. These devices may include, but are not limited to, a G.711 communications device 532, a G.722.1 communications device 534, and a videoconferencing device 536. In further embodiments of the present invention, audio signals may be presented to the user through the computing device 530 and/or data may be displayed or presented at the communications device 526. Because communications is bilateral, the conferencing system 500 may operate in the reverse (i.e., the communications device 526 transmits signals to the communications device 506).

In one embodiment, the transcoder 518 encodes digital audio signals according to ITU standards (e.g., G.711 for either PBX or ISDN channels, etc.). Additionally, the transcoder 518 encodes audio signals in accordance with ITU standards (e.g., G.722.1, etc.) for wideband transmission above 7 kHz. Further, alternative components encompassing other ITU, non-ITU standards, or other techniques are interchangeable with the transcoder 518. The transcoder 518 also can direct the receiving wideband communications device 526 (or communications device 506 in the reverse process) to a particular network address for data retrieval.

The data conferencing server 520 is integrated within the gateway media control unit 516, and can be used by all conferencing parties. The storage and retrieval of data from the data conferencing server 520 is controlled by signals passed between the wideband communications devices 506 and 526. In further embodiments, it is possible for narrowband devices to participate in a wideband speakerphone conference. As will be described further below in connection with FIGS. 8 and 9, the present invention allows for determination of whether participating communications devices are wideband or narrowband, and can adjust communications accordingly.

Figure 5B:
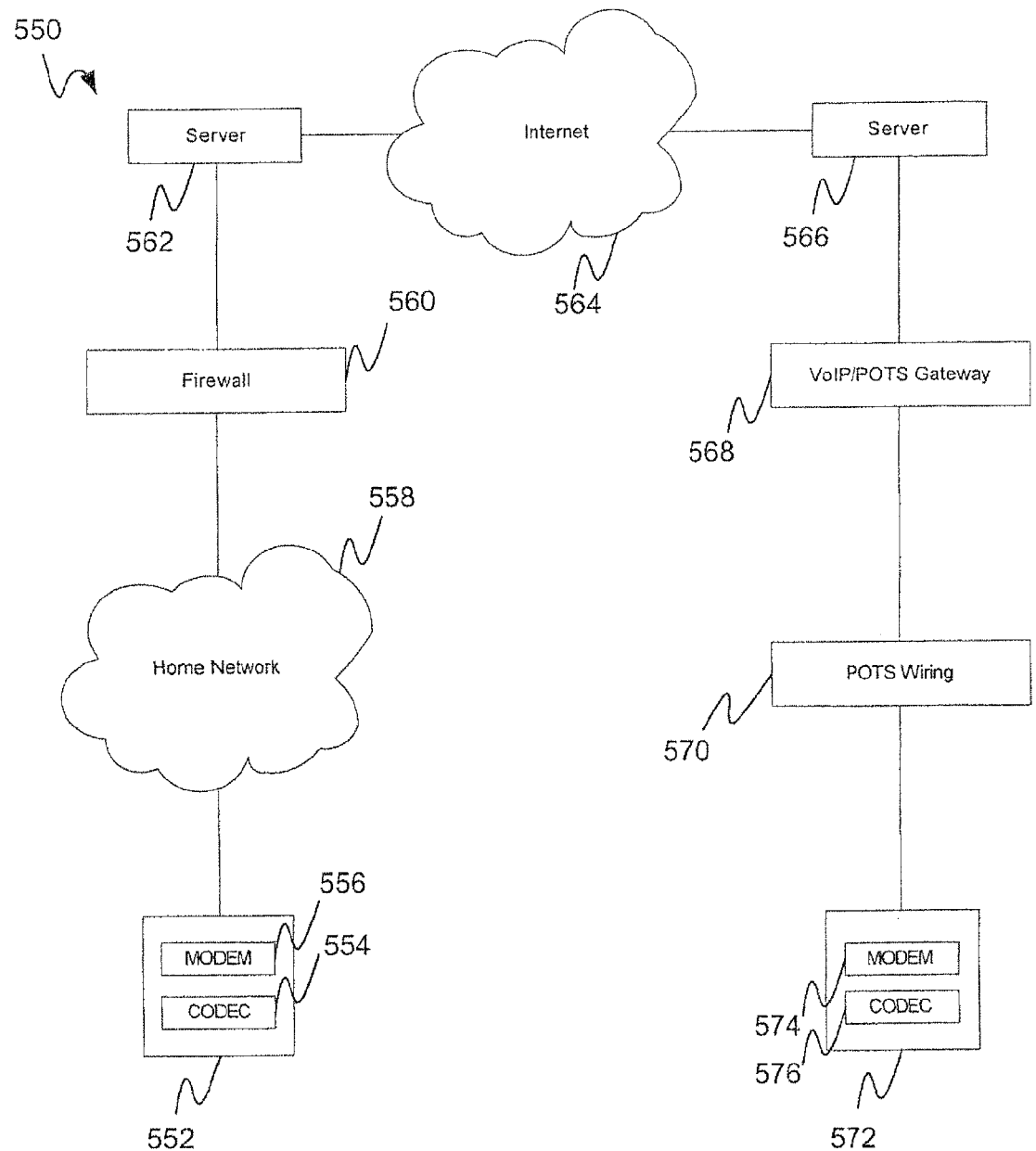
FIG. 5b illustrates a conferencing system utilizing a gateway when one device in on POTS and a second device in on an IP network.

FIG. 5b is an exemplary conference system 550 whereby one communications device 552 is located on an IP network, while a second communications device 572 uses POTS. In this embodiment, the communications device 552 encodes audio via a codec 554. The audio data packets are then switched via a modem 556 through a home network 558 or similar network (e.g., LAN, WAN, etc.). The audio data packets are sent through a firewall 560 (if one exists) to an access server 562, which allows the audio data packets to be switched onto an Internet backbone 564.

The packets are then sent to a destination server 566, and to a VoIP/POTS gateway 568. The VoIP/POTS gateway 568 translates between the VoIP's version of wideband audio to a form of wideband audio utilized by the communications device 572. Once translated, the packets are sent through POTS wiring 570 to the communications device 572. The packets are then demodulated by an internal modem 574 and decoded by an internal codec 576. The audio is then presented to a user of the communications device 572 via an internal speaker (not shown).

The conference system 550 is a bilateral communications system. Therefore, audio may be sent from the POTS communications device 572 to the VoIP communications device 552. In this embodiment, audio is received by an internal microphone in the communications device 572 and encoded by the codec 576. The digitized audio signals are then sent via the modem 574 to the VoIP/POTS gateway 568 via the POTS wiring 570. The VoIP/POTS gateway translates the POTS wideband signal into a VoIP wideband signal compatible with the communications device 552. Subsequently, the signal is then routed to the communications device 552.

Figure 6A:
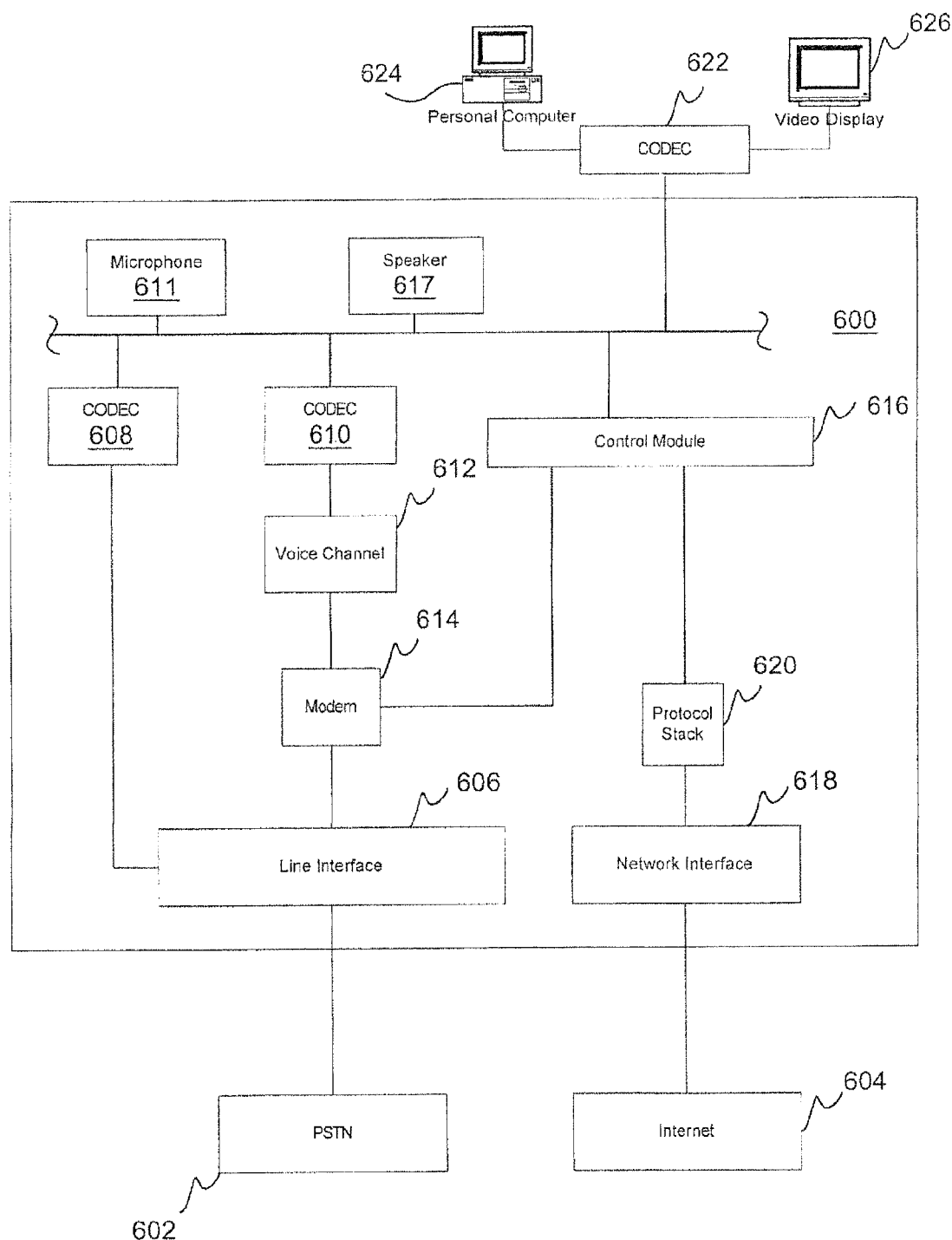
FIG. 6a illustrates an exemplary wideband communications device.

In further keeping with exemplary embodiments, FIG. 6a illustrates an exemplary block diagram of a wideband communications device 600 of the present invention. The wideband communications device 600 is coupled to a PSTN 602. In one embodiment, the wideband communications device 600 is also optionally coupled to the Internet 604. For signals switched over the PSTN 602, a line interface 606 relays signals to and from either a codec 608 (e.g., G.711 codec) or a codec 610 (e.g., G.722.1 codec) which encodes audio signals received by a microphone 611 or similar audio sensor, and decodes audio signals received from a remote site. The codec 610 is coupled to the line interface 606 via an optional voice channel 612 and a digital modem 614. In one embodiment, the codec 608 may operate in narrowband, while the codec 610 and the modem operate in wideband. In alternative embodiments, more or less codecs may be embodied in the communications device 600.

Further coupled to the modem 614 is a control module 616. The control module 616 enables users to manage calls and adjust sounds rendered audible by a speaker 617. Supervisory control of conferencing is also handled by the control module 616, which provides control data to conferencing parties in order to modify conferencing parameters. These parameters include directing the type and manner of audio and/or video display, caller intervention, secure access and retrieval of data, and a variety of other functions. The modem 614 receives both the audio and control data signals, and forwards the signals to the line interface for transmission over the PSTN 602. Thus, the communications device 600 may provide a digital control channel and a voice channel over a modem link to the PSTN 602. On a receiving end, the control data may be sent to a control module of the receiving communications device where the parameters may then be altered.

For digital data over the Internet 604, a network interface 618 (e.g., Ethernet interface) relays signals to and from a protocol stack 620. The protocol stack 620 establishes Internet voice and protocol video conferencing sessions. For data received from the Internet 604, the data signals are passed to the control module 616. Ultimately, conferencing video or other data are decoded by a codec 622, and transmitted to a computing device 624 and/or a video display 626. When sending data over the Internet 604, the codec 622 encodes the data from the computing device 624, and forwards the encoded data to the communications device 600. The communications device 600 then processes the signals before forwarding the data to the Internet 604 via the network interface 618.

In a further embodiment of the present invention, the communications device 600 further comprises an embedded audio echo canceller. This audio echo canceller allows for full-duplex conversation between participating endpoints. In one embodiment, this audio canceller may be embodied in the voice channel 612.

Figure 6B:
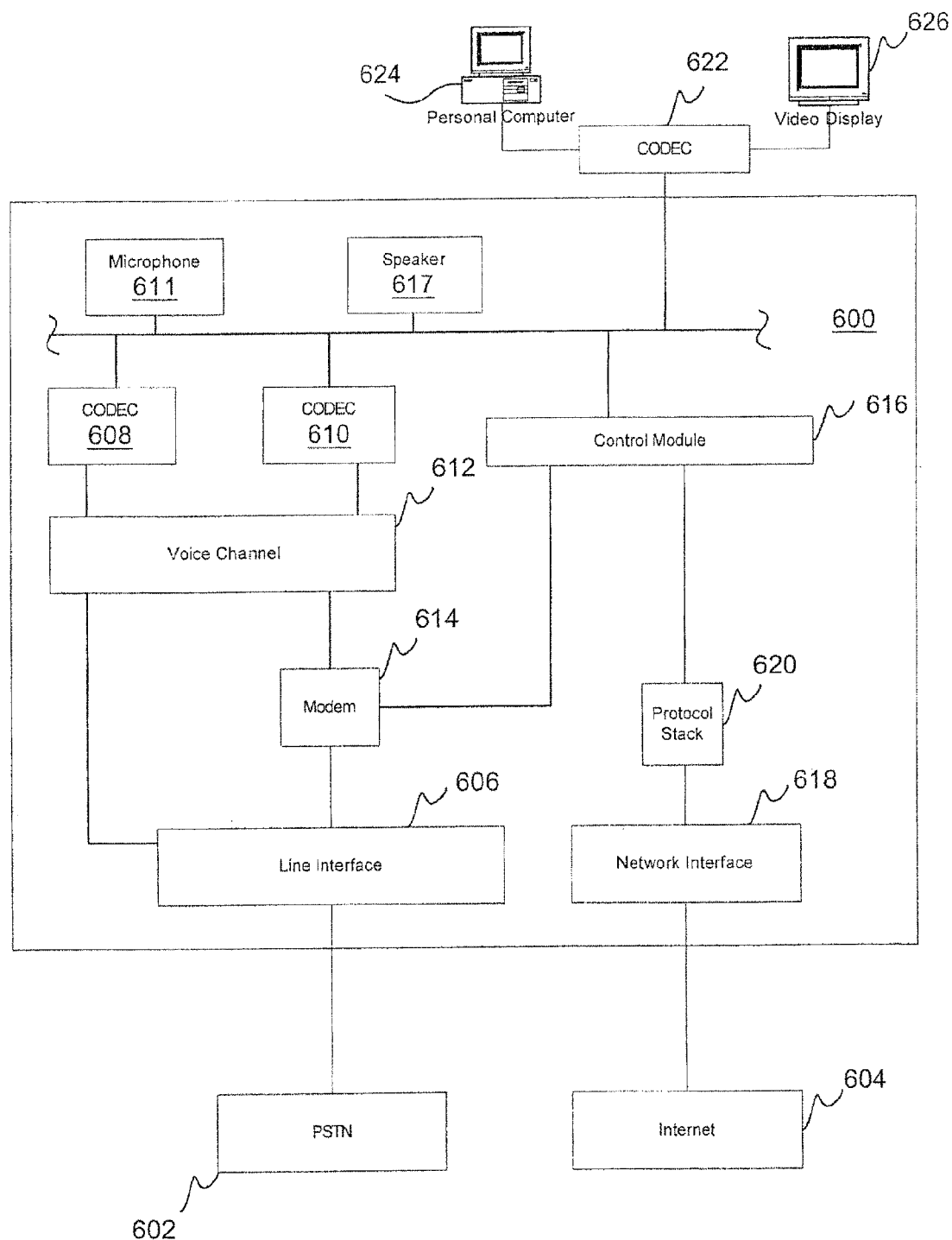
FIG. 6b illustrates an alternative exemplary wideband communications device.

FIG. 6b shows an alternative embodiment of the wideband communications device whereby both codecs 608 and 610 are coupled to the voice channel 612. In this embodiment, the voice channel 612 comprises the audio echo canceller. Thus all audio signals must pass through the audio echo canceller, which provides full-duplex functions in narrowband or wideband mode. Further, in an exemplary embodiment of the wideband communications device 600, the codec 608 operates in narrowband mode, while the codec 612 and the modem operate in wideband mode.

With regards to both embodiments of FIGS. 6a and 6b, alternatively, the wideband communications device 600 may only be coupled to the PSTN 602. In this embodiment, the protocol stack 620 and the network interface 618 are not present in the wideband communications device 600. In further embodiments, more or less elements may be present in the communications device. However, it is preferred that the integrated wideband communications device 600, at a minimum, comprises at least one codec, a modem, a microphone, and a speaker. Additionally, the communications device 600 may not be coupled to the codec 622, the computing device 624, and the video display 626.

Figure 7:
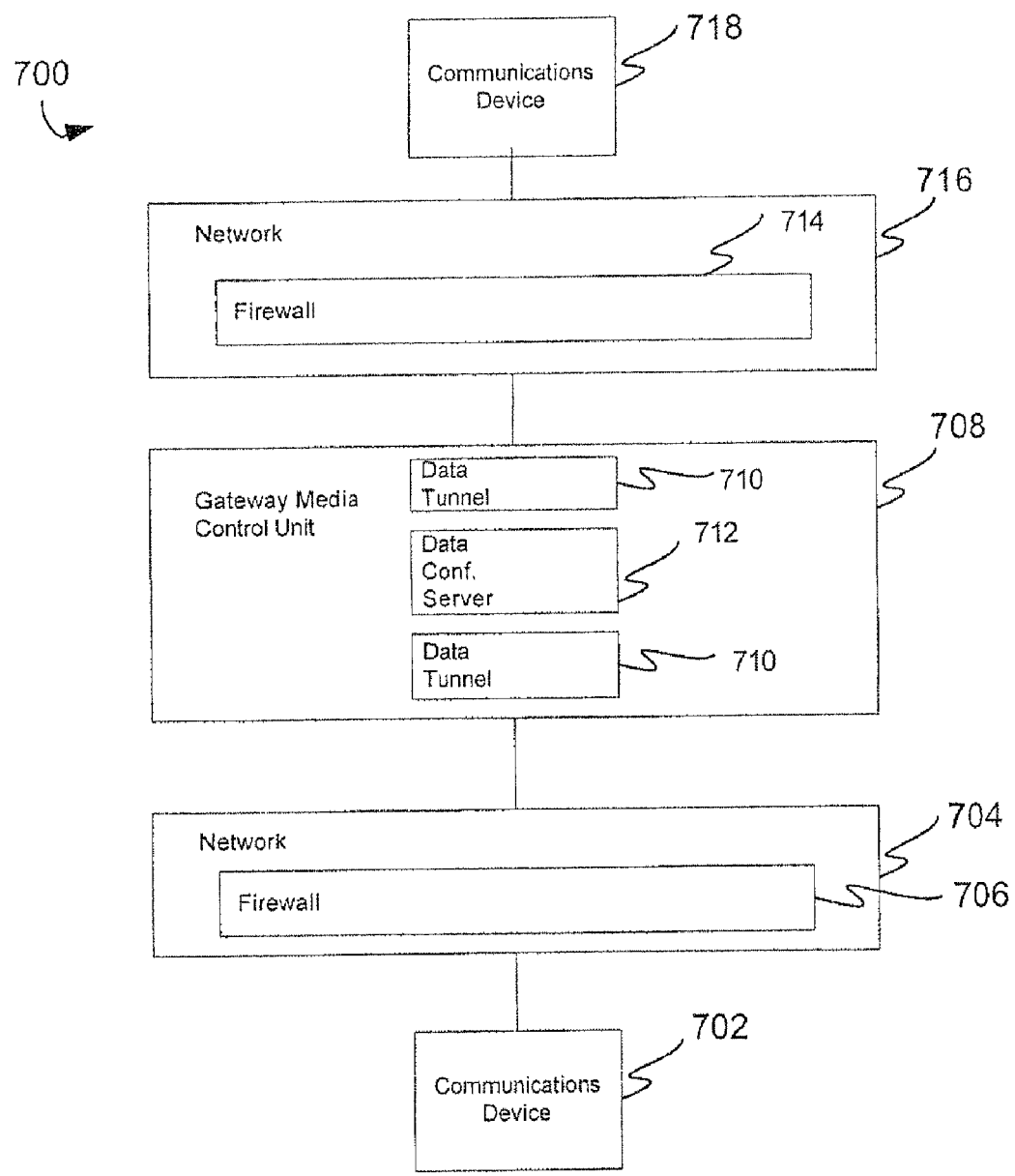
FIG. 7 is exemplary signal flow path for wideband data exchange.

There are primarily two main purposes to wideband data exchange. The first purpose is to transmit data between endpoints. The second purpose is to direct an endpoint to a location such as a central office data storage repository to retrieve conferencing data such as spreadsheets or images. Referring to FIG. 7, an exemplary signal flow path 700 for wideband data exchange is shown. Control signals containing encrypted data and session keys from an initiating wideband communications device 702 pass through a network 704 and an optional security firewall 706 to a gateway media control unit 708. The gateway media control unit 708 initiates a data exchange using Session Initial Protocols (SIPs) that establish data tunnels 710 on either end of a data conferencing server 712. The data tunnels 710 permit exchange of security information such as session keys that encrypt specific network addresses for the data conferencing server 712. Data retrieved or sent must pass through a destination firewall 714 (if one exists) of a destination network 716 before reaching a receiving wideband communications device 718.

In one embodiment, the gateway media control unit 708 controls connections of H.263 bi-directional data streams between two endpoints. Initially, the gateway media control unit 708 receives HTTP connections from the two endpoints (e.g., wideband communications devices 702 and 718), and if the two endpoints present matching session keys, the gateway media control unit 708 connects the H.263 data streams to each endpoint. Additionally, the gateway media control unit 708 may validate that each endpoint is registered and authorized for service.

Data can be either sent directly between the transmitting wideband communications device 702 and the receiving wideband communications device 718, or directed for retrieval from the data conferencing server 712 by passing control data such as session keys. For larger amounts of data, the preferred method would be to pass control data or signals using the flow path 700 described in FIG. 7, thus reducing the amount of data passed between endpoints. By storing data on the data conferencing server 712, the amount of necessary data transmitted is reduced to the encrypted network address passed between endpoints. In one embodiment, the control data and session keys are sent via a PSTN connection, while data is sent/retrieved via the Internet. This method leverages the use of combined analog PSTN and data network connections (e.g., the Internet) to reduce call latency and delay. Although FIG. 7 is described in connection to data exchange, a similar signal path may be utilized for the exchange of wideband audio.

In an alternative embodiment, data may be stored on an internal server. Due to security concerns of storing data on the Internet, some users may prefer to host a web server on their own internal system. In this situation, the communications devices are configured to point to the private, internal server via a web page in each communications device. This configuration may be performed once when the communications device is installed.

Figure 8:
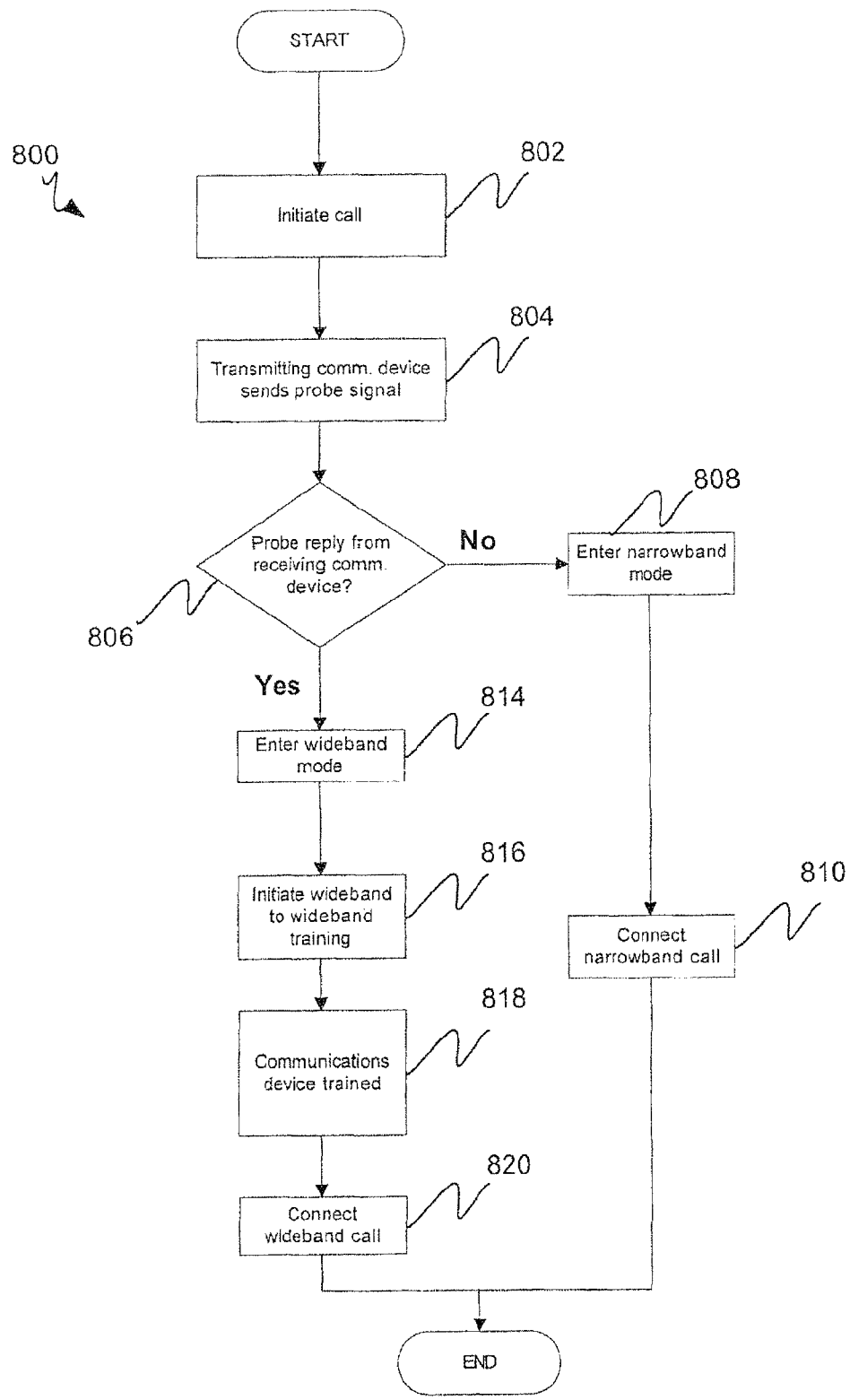
FIG. 8 is an exemplary flowchart illustrating a method of establishing a wideband telephony conference.

Referring to FIG. 8, an exemplary flowchart 800 illustrates one method for initiating a wideband audio conference with an optional data side-channel. At step 802, a call is initiated, and the audio portion is linked. Subsequently, a wideband probe signal is sent from an initiating wideband communications device in step 804. The purpose of the wideband probe is to determine whether a receiving communications device, computing device, etc. is wideband telephony-capable. If at step 806 a wideband probe query does not receive a response, then the transmitting wideband communications device enters a narrowband mode at step 808 and connects the call as a narrowband call at step 810. Consequently, the behavior of the wideband communications device is typical of an analog, PSTN-switched POTS call.

Alternatively, if the wideband probe reply signal is returned positively at step 806, then the wideband communications device shifts to a wideband mode at step 814. In the wideband mode, the wideband communications device begins initiating training at step 816 with the receiving communications device. Training is a telecommunications technique used by many modems for ensuring that QoS and call quality are maximized by synchronizing modems to each other, adjusting for changing line conditions such as delay, signal distortion and amplitude response, etc. Training usually, but not always, occurs prior to establishing a connection, depending on the specifications of the modem. If two modems/communications devices fail to train, a call connection will not be established.

Once both wideband communications devices are trained and synchronized at step 818 to exchange both voice and optional data signals, the call is connected at step 820. In the wideband mode, both endpoints (i.e., the transmitting wideband communications device and the receiving communications device) will hear sounds employing audio signals up to 7 kHz, in one embodiment. It is contemplated that other frequencies can be used, or that other audio enhancements, such as stereo, or enhanced dynamic range, can be transmitted. Conferencing parties can also exchange data or direct another parties to retrieve data from data storage repositories. These enhancements lead to a high degree of interactivity and increased capabilities for multimedia communication.

In an alternative embodiment, the initiating wideband communications device may determine a receiving communications device is not wideband capable without using a probe. In this embodiment, once the audio is linked, the receiving communication device may respond with speech (e.g., a user of the receiving communications device says "hello"). Upon receiving the speech, the initiating communications device determines the receiving communications device is not wideband capable, and the audio only conference (i.e., narrowband connection) can start.

Figure 9:
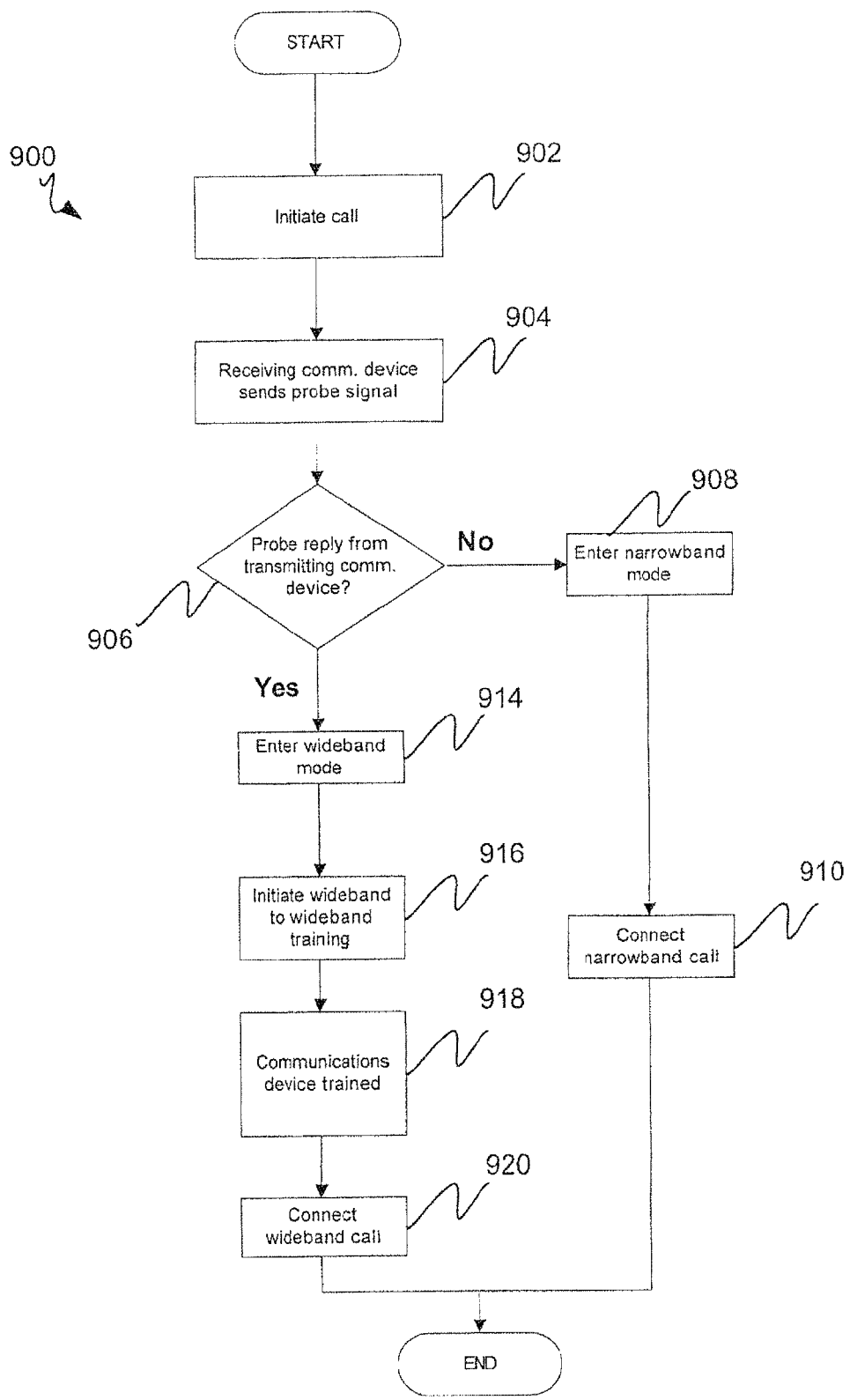
FIG. 9 is an exemplary flowchart illustrating an alternative method of establishing a wideband telephony conference.

FIG. 9 illustrates an alternative embodiment whereby the receiving communications device initiates a wideband probe. At step 902, a call is initiated by a transmitting communications device. Subsequently, an audio link is established between the transmitting communications device and a receiving communications device. Next, a wideband probe signal is sent from by the wideband, receiving communications device in step 904 to determine whether the transmitting communications device is wideband telephony-capable. If at step 906 a wideband probe query does not receive a response, then the receiving, wideband communications device enters a narrowband mode at step 908 and connects the call as a narrowband call at step 910. Consequently, the behavior of the wideband communications device is typical of an analog, PSTN-switched POTS call.

Alternatively, if the wideband probe reply signal is returned positively at step 906, then the wideband communications device shifts to a wideband mode at step 914. In the wideband mode, the wideband communications device begins initiating training at step 916 with the transmitting communications device. Once both wideband communications devices are trained and synchronized at step 918 to exchange both voice and data signals, the call is connected at step 920. As described with reference to FIGS. 3-5, once the wideband connection has been established, both audio and data may be transmitted between the wideband communications devices.

In embodiments of FIGS. 8 and 9 where a wideband conference is established, the systems may monitor for line conditions and adjust accordingly. For example, quality of an audio (and possibly data) connection may be adjusted based on available data bandwidth. The more bits that can be sent over the PSTN, the better the quality audio codec setting can be used for encoding the audio (and optional data) signals. Further, the present system may automatically adjust the quality of the connection during a call, and in some situations, will even drop the call to a conventional analog, narrowband connection when the connection quality drops too low.

For purposes of clarity, some references to data may be construed to refer to audio data or digitized audio signals, while other references may refer to control data, or alternatively to video/graphics data.

The invention has been described above with reference to exemplary embodiments. Many variations of the invention will become apparent to those of skill in the art upon review of this disclosure. For example, more devices may be coupled to the wideband communications device for providing data signals. Further, although exemplary codecs and standards have been described for use in the present invention, those skilled in the art will recognize that other codecs and standards may be utilized. Therefore, the scope of the invention should be determined not with reference to the above description, but instead should be construed in view of the full breadth and spirit of the invention as disclosed herein.

What is claimed is:

1. A method for wideband conferencing over a narrowband Plain Old Telephone System (POTS) connection from a first device, comprising:

opening one narrowband analog audio connection to a second device over a POTS connection;

receiving an indication that the second device is wideband capable;

transmitting a first wideband digital audio signal over the narrowband audio connection from the first device; and receiving a second wideband digital audio signal from the second device.

2. The method of claim 1, wherein the first and the second wideband digital audio signals have audio frequencies above 3.4 KHz.

3. The method of claim 1, further comprising sending an audio probe prior to receiving the indication that the second device is wideband capable.

4. The method of claim 1, further comprising sending a predetermined audio acknowledgement after receiving the indication that the second device is wideband capable.

5. The method of claim 1, further comprising adjusting quality of the connection based on available bandwidth.

6. The method of claim 5, wherein the adjusting further comprises modifying a setting of an audio codec in the first device.

7. The method of claim 5, wherein when the available bandwidth on the POTS connection is below a threshold, the communication between the first device and the second device reverts to analog narrow band audio communication.

8. The method of claim 1 further comprising utilizing audio echo cancellation in the first device to allow for full-duplex conversation.

9. The method of claim 1, wherein the first device comprises a wideband capable telephone.

10. The method of claim 1, wherein the first device comprises a personal computer.

11. A device capable of conducting a wideband conference over a narrowband analog Plain Old Telephone System (POTS) connection, comprising:

a codec;

a modem coupled to the codec and for coupling to the analog POTS connection; and a controller coupled to the codec and the modem;

wherein the codec is operative to convert analog audio signals to wideband digital signals and wideband digital signals to analog audio signals;

wherein the modem is operative to modulate and demodulate digital signals exchanged through the POTS connection; and wherein the controller is operative to receive an indication that a second communication device connected over the POTS connection is wideband capable.

12. The device of claim 11, wherein the controller is operative to send an audio wideband probe prior to receiving the indication that the second communication device is wideband capable.

13. The device of claim 11, wherein the controller is operative to send an audio wideband acknowledgement after receiving the indication that the second communication device is wideband capable.

14. The device of claim 11 where in the codec is a G.711 codec.

15. The device of claim 11 wherein the codec is a G.22.1 codec.

16. The device of claim 11 further comprising an audio echo canceller coupled to the codec to allow full-duplex audio communication.

17. The device of claim 11 wherein the audio communication has audio frequencies above 3.4 KHz.

18. The device of claim 11 wherein the controller is operative to adjust quality of connection based on available bandwidth.

19. The device of claim 18, wherein the controller is operative to switch the wideband digital audio communication to a narrow band analog audio communication when the available bandwidth drops below a threshold.

20. A computer readable medium having embodied thereon a program, the program being executable by a machine for wide audio band conferencing on a narrow audio band network to perform a method as in any one of claims 1, 2, 3-8, 9 or 10.

* * * * *